United States Patent Office 3,168,583
Patented Feb. 2, 1965

---

3,168,583
SELECTIVE DEETHYLATION PROCESS
Stephen M. Kovach, Highland, Ind., assignor to Sinclair Research, Inc., Wilmington, Del., a corporation of Delaware
No Drawing. Filed Dec. 15, 1961, Ser. No. 159,763
3 Claims. (Cl. 260—672)

The present invention relates to a process for the selective hydrocracking of alkyl benzenes. In one specific embodiment the invention relates to a process for substantially reducing the ethyl-substituted benzene content of a polymethylbenzene feed containing the same.

Many conversion processes provide polymethylbenzenes known to be useful as solvents or intermediates, for example, for the production of synthetic polymers. Polymethylbenzenes are commonly oxidized to polycarboxylic acids which in turn can be converted to other compounds having utility in synthetic polymer formation. Generally however, these polymethylbenzene streams obtained from conversion processes such as from catalytic reformates contain, in addition, ethylbenzenes and ethyltoluenes which are difficult to separate from polymethylbenzenes such as di- and trimethylbenzenes. Moreover, disproportionation in the liquid or vapor phase or methylation of xylene or trimethylbenzene streams are promising processes for the production of polymethylbenzenes such as durene(1,2,4,5 polymethylbenzenes). Since these streams ordinarily contain ethylbenzenes and ethyltoluenes, the disproportionation or methylation operations also contain ethylalkylbenzenes. Consequently, product purity and ultimate yields suffer due to the ethylalkylbenzenes.

I have now discovered that polymethylbenzenes containing ethyl-substituted benzenes usually in an amount of about 10 to 50% by weight, can be selectively hydrocracked to obtain polymethylbenzenes substantially reduced in ethyl-substituted benzene content by contacting the feed stock with a catalyst consisting essentially of catalytic amounts of chromia and boria on alumina under conditions which will selectively convert the ethyl groups on the ethyl-substituted benzenes through demethanation and/or deethanation. The ethyl-substituted benzene content is generally found to have been reduced at least about 20, preferably at least about 40%. Thus, in accordance with the present invention polymethylbenzenes having very little ethyl-substituted benzenes in admixture can be obtained in a one-step process.

The selective hydrocracking of the present invention is conducted by contacting the ethyl-substituted benzene-containing polymethylbenzene in the presence of molecular hydrogen with the chromia-boria-alumina catalyst of the present invention at a temperature of about 400 to 1100° F., preferably about 500–1000° F. Other useful conditions include a pressure ranging from about atmospheric to 2000 p.s.i.g., preferably about 50 to 1000 p.s.i.g.; a weight hourly space velocity (WHSV) of about .01 to 10, preferably about 0.1 to 5 and a hydrogen to hydrocarbon ratio of about 1 to 20:1, preferably about 2 to 10:1.

The catalyst of the present invention includes catalytically effective amounts of chromia and boria supported on an alumina base. The catalyst generally contains about 1–20% chromia, preferably about 5–10% by weight and about 3–20% by weight of boria, preferably about 10–15%. The chromia and boria constituents of the catalyst are deposited on an alumina base, preferably of the activated or calcined type. The base is usually the major component of the catalyst, generally constituting at least about 60 weight percent on the basis of the catalyst, preferably at least about 75–90%. The preferred catalyst base is an activated or gamma alumina such as those derived by calcination of amorphous hydrous alumina, alumina monohydrate, alumina trihydrate or their mixtures. The catalyst base precursor most advantageously is a mixture predominating for instance, in about 65–95 weight percent in one or more of the alumina trihydrates bayerite I, bayerite II (randomite) or gibbsite, and about 3–35 weight percent of alumina monohydrate (boehmite), amorphous hydrous alumina or their mixture. The alumina base can contain small amounts of other nondeleterious solid oxides and promoters.

The chromia component of the catalyst can be added to the alumina base by known procedures involving impregnation using a water soluble compound of chromium or by coprecipitation. Suitable water soluble compounds include chromium nitrate, sulfate or chloride, chromic acid etc. Chromium nitrates are preferred in that they have the advantage of decomposing to the oxides after calcination without leaving a residue which is difficult to wash out. The alumina hydrate containing the chromia component can be dried and calcined, usually at a temperature from about 750–1200° F. or more to provide the activator or gamma-alumina modifications. The boria can be added to the catalyst at any stage of its preparation. It may be incorporated in the support, for instance, by precipitation, coprecipitation, impregnation, and mulling either before or after addition of the chromia. It can also be applied by impregnation from solutions (water, organic or inorganic solvents) or from a gas. However, it is frequently added to the catalyst after it has been formed by depleting or extrusion and calcined. After the boria is added in this procedure, the catalyst can be recalcined. The catalyst of the present invention can be easily regenerated employing conventional procedures, for instance by subjecting it to an oxygen-containing gas at temperatures sufficient to burn off carbon deposited on the catalyst during the hydrocracking of petroleum. This oxygen-containing gas, e.g. an oxygen-nitrogen mixture, may contain about 0.01 weight percent to 5 or more weight percent oxygen and is introduced at a flow rate such that the maximum temperature at the site of combustion is preferably below about 1000° F.

The polymethylbenzene feedstock of the present invention are polymethylbenzene feeds of 8–11 carbon atoms containing usually about 10–50% by weight of ethyl-substituted benzenes. The polymethylbenzene component of the feedstock contains 2 to 5 methyl groups on the benzene ring, which methyl groups are the only alkyl substituents and are attached to different carbon atoms of the ring. As to the ethyl-substituted benzene, the ring might be further substituted as with methyl groups or with other non-interferring constituents. The preferred feed is a material essentially or substantially completely of a material of the same number of carbon atoms, e.g. $C_8$, $C_9$ or $C_{10}$, etc. Ordinarily, the feed will be that obtained from the polymethylbenzenes obtained from hydrocarbon conversion operations and will usually consist essentially of mixtures of polymethylbenzenes, that is, benzenes substituted with 2 to 5 methyl groups and ethyl-substituted benzenes such as ethylbenzenes and ethyltoluenes.

The present invention will be further illustrated by the following example:

EXAMPLE

A feedstock comprising 56.5% by weight of trimethylbenzenes and 43.5% of ethyl-substituted toluenes was selectively hydrocracked under the conditions shown in Table I below employing a 10% chromia-10% boria on alumina catalyst. The results are shown in Table I below.

*Table I*

| | |
|---|---|
| Run No. | 1122-25. |
| Catalyst | 10% $Cr_2O_3$—10% $B_2O_3$ on $Al_2O_3$. |
| Feed | 56.5% trimethyl benzenes, 43.5% ethyltoluenes. |
| Conditions: | |
|     Temperature, °F. | 750 |
|     Pressure, p.s.i.g. | 400 |
|     WHSV | .29 |
|     $H_2/H'C$ | 7/1 |
| Product-weight percent feed: | |
|     Ethylbenzene | --- |
|     Ethyltoluene | 27.5 |
|     Ethylxylene | 1.0 |
|     Ethyltrimethylbenzene | 0.7 |
| Mole percent: | |
|     Ethyl group cracking | 34 |
| Moles/100 moles ethyl groups fed: | |
|     $CH_4$ | 3.5 |
|     $C_2H_6$ | 23.6 |

Examination of the data of Table I shows that ethyl-substituted toluene content was substantially reduced by the process of the present invention.

I claim:

1. A process for selectively cracking a polymethylbenzene feedstock consisting essentially of polymethylbenzene containing 2 to 5 methyl groups on the benzene ring, which methyl groups are the only alkyl substituents, and about 10 to 50% by weight of ethyl-substituted benzenes to reduce the ethyl-substituted benzene content of the feedstock which process consists essentially in contacting said feedstock with a catalyst consisting essentially of chromia and boria on alumina, in the presence of hydrogen at a temperature of about 400 to 1100° F.

2. The process of claim 1 wherein about 5–10% chromia and 10–15% boria are employed.

3. The process of claim 2 wherein the temperature is about 500–1000° F.

References Cited in the file of this patent
UNITED STATES PATENTS

| | | |
|---|---|---|
| 2,776,326 | Schneider | Jan. 1, 1957 |
| 3,033,777 | Moy et al. | May 8, 1962 |